Nov. 26, 1968    G. WOHLERT ETAL    3,412,952
SELF-RETRACTING WEBBING ROLLER FOR SAFETY BELTS
Filed Oct. 10, 1966    4 Sheets-Sheet 1

Inventors
GÜNTER WOHLERT &
WOLFGANG WOLFF
By
Lowry & Rinehart
ATTYS.

3,412,952
SELF-RETRACTING WEBBING ROLLER FOR SAFETY BELTS
Gunter Wohlert, Hamburg-Wandsbek, and Wolfgang Wolff, Hamburg-Rahlstedt, Germany, assignors to Sigmatex A.G., Basel, Switzerland
Filed Oct. 10, 1966, Ser. No. 585,517
Claims priority, application Germany, Oct. 9, 1965, S 100,011
7 Claims. (Cl. 242—107.4)

ABSTRACT OF THE DISCLOSURE

A self-retracting webbing roller apparatus for safety belts as used in motor vehicles and aircraft. The apparatus includes a toothed wheel fixed to a roller and controlled by a spring loaded pawl. The pawl has a locked position and an unlocked position. The position of the pawl is controlled by a self-acting member which comprises a rotatably mounted disk adjacent the toothed wheel and having a cam. The pawl is in an unlocked position while in contact with the cam during the uncoiling of a belt. The pawl is automatically disengaged from the cam thereby entering into a locked position when tension on the belt is reduced.

Background of the invention

Self-retracting webbing rollers are known which are provided with a spring by means of which the safety belt is coiled up so as not to lie about freely in the passenger's cabin when not in use. Moreover, a self-retracting webbing roller has already been proposed, the housing of which is provided with a pair of ratchets which are acted upon by a spring and which upon insertion of another part of a buckle engage in a toothed wheel blocking the webbing roller.

While such devices serve their intended purposes within certain inherent limitations, they have several disadvantages. To eliminate said disadvantages it is, therefore, the object of the present invention to provide a self-retracting webbing roller for safety belts which is simple in construction, easy to operate and which will effectively and efficiently perform the purposes for which it is intended.

This object is attained according to the present invention by providing a self-retracting webbing roller for safety belts which comprises a main housing having a base plate and side walls, a spring loaded roller rotatably mounted in said housing, at least one toothed wheel carried by said spring-loaded roller, a pivotally mounted ratchet arranged to engage in its locking position in said toothed wheel, and a self-acting control member for the ratchet which retains the ratchet in its unlocking position when the webbing belt uncoils and releases it into its locking position when the external pull at the webbing belt is reduced.

In this arrangement the self-acting control member may be a lever rotatably mounted in the main housing. It has, however, been proved to be particularly expedient, as regards reliable functioning and reduced expenditure, when the control member is constructed as an unlocking disk rotatably mounted in the main housing and the position of the unlocking disk is variable owing to the return spring acting upon the spring-loaded roller.

Preferably such an unlocking disk may be coupled with the toothed wheel so as to have frictional contact, said toothed wheel being subjected to the tension of the return spring so that the unlocking disk is taken along by the toothed wheel when the latter rotates.

According to another feature of the invention the unlocking disk is provided with a nose which retains the ratchet in its unlocking position when the webbing belt is being pulled out. Moreover, the arrangement is preferably such that the unlocking disk is turnable only through a small angle of rotation and in such a manner that in one extreme position the ratchet is held in its unlocking position and in the other extreme position the ratchet is released into its locking position. This is attained according to the invention in that the turning range of the unlocking disk is limited within the housing to a small angle of rotation by means of stops.

According to yet another feature of the invention it is possible with the aid of a guide plate on the housing to rotate the unlocking disk into a position in which it releases the ratchet into its locking position. Thereby the user of the safety belt can make sure or check himself that, after putting on the webbing belt, the ratchet is in its locking position so that in the case when an accident occurs the belt cannot uncoil from the webbing roller. It has also been found to be expedient if, in this connection, the guide plate is arranged relative to the webbing belt in such a manner that it is automatically operated by the latter when the webbing belt is subjected to a strong tensile force when in its operative position. Safety is achieved in that, at the latest, when the vehicle rolls over, which causes a sudden and very strong pull at the webbing belt, the ratchet is released into its locking position so that the webbing belt cannot uncoil any further, thereby ensuring that the passenger remains on his seat. The fact that the ratchet is spring-loaded and rests against the unlocking disk as well as against the toothed wheel also in its unlocking position, helps to ensure such an immediate shifting of the ratchet into its locking position.

An advantageous feature of the invention consists in that the ratchet may be provided with an operating lever, by means of which it is pivotable from its locking position into its unlocking position. This ensures that the webbing belt can be easily coiled up or uncoiled, if necessary. Instead of the operating lever a knob may also be used which is arranged e.g. on the outside of the main housing of the webbing roller and which when it is pressed into the housing or shifted pivots the ratchet into its unlocking position.

Thus the present invention provides a self-retracting webbing roller for safety belts, wherein upon a reduction or termination of pull at the end of the webbing belt, as for instance immediately after pulling out the webbing belt to a desired length or upon a pulling of the self-retracting webbing roller, whereby the webbing belt is uncoiled, the webbing roller is blocked, thus preventing a further uncoiling of the webbing belt. Thereby it is intended to prevent the webbing belt from uncoiling from the webbing roller, e.g. when an accident occurs, and to reliably retain that length to which it has been adjusted by uncoiling when put on. In addition, the design of the webbing roller should be such that for locking the webbing roller, the insertion of another part of the buckle is not absolutely necessary. It is intended to be able to lock the webbing roller also in those embodiments of self-retracting webbing rollers, in which the self-retracting webbing roller is secured to the body of the vehicle in one place and the free end of the webbing belt which is to be uncoiled is fastened in another place or to a part of the buckle arranged in another position after is has been pulled out of the self-retracting webbing roller.

Brief description of drawings

A preferred embodiment of the invention will now be described by way of example and with reference to the accompanying drawings, in which.

*Description of specific embodiments*

Figure 1:
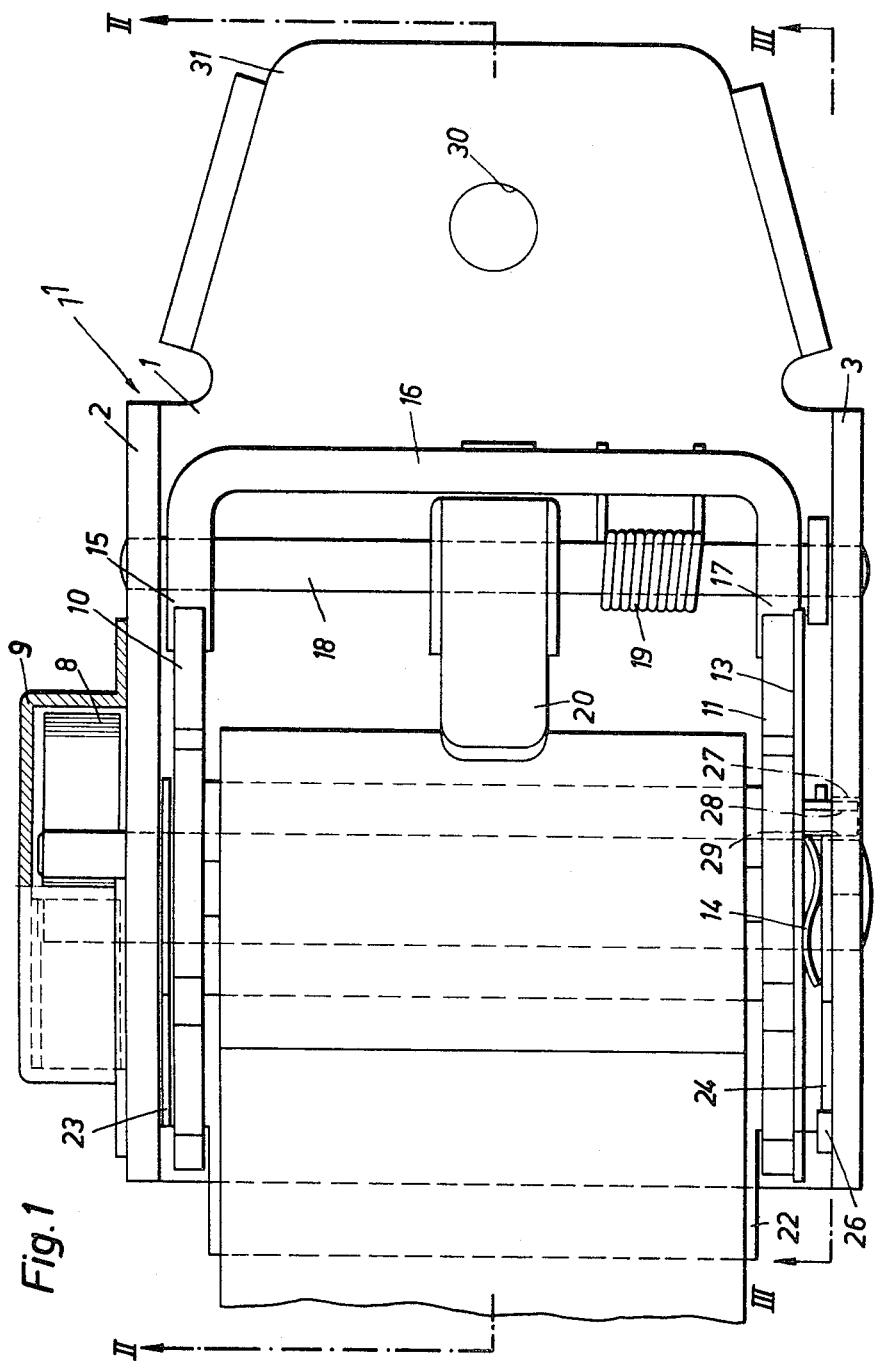
FIG. 1 is a top plan view of a self-retracting webbing roller with the ratchet in locking position.

FIG. 1 shows a self-retracting webbing roller which comprises a main housing 1¹ substantially consisting of a base plate 1 and two side walls 2 and 3. The two side walls 2 and 3 carry a shaft 4 (FIG. 2) which in turn supports a hollow shaft 5 surrounding it in a concentric manner and from which a webbing belt 6 can be uncoiled in the direction of the arrow 7 by pulling at the webbing belt 6. This uncoiling is effected against the resistance of a return spring 8 (FIG. 1) which is arranged in a spring housing 9 on the outer surface of the side wall 2 and engages in the shaft 4.

Adjacent the inner surfaces of the two side walls 2 and 3 two toothed wheels 10 and 11 are mounted on the hollow shaft 5 which are provided with saw tooth-like indentations 12. Furthermore, next to the outer side of the toothed wheel 11 an unlocking disk 13 is mounted on the shaft 4 so as to be freely rotatable thereabout. This unlocking disk 13 is pressed against the outer side of the toothed wheel 11 by means of a spring 14 so as to be in frictional contact with said toothed wheel 11.

Figure 3:
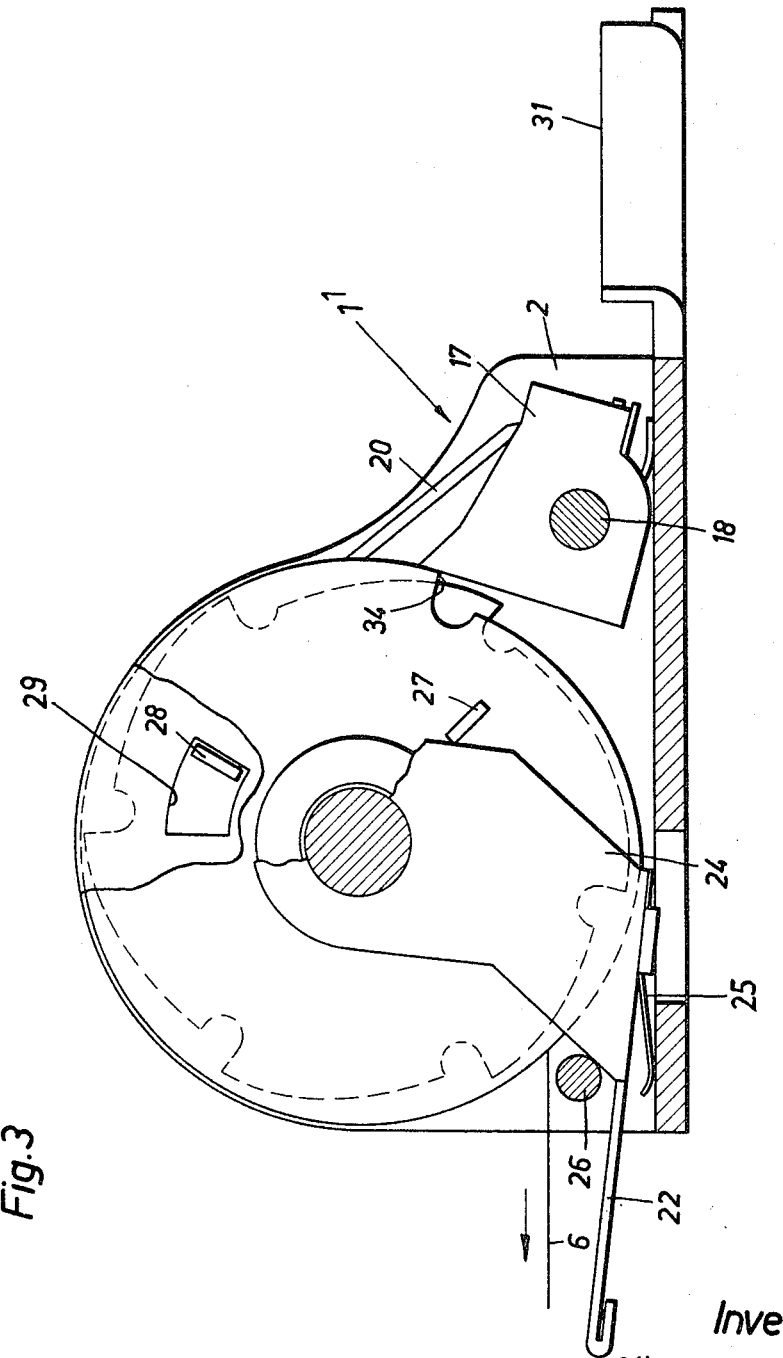
FIG. 3 is a cross section on the line III—III of FIG. 1, the ratchet being shown in unlocking position.

The unlocking disk 13 is provided with a nose 34 which co-operates with a ratchet 17 (FIG. 3).

The ratchet 17 is formed by one leg of a U-shaped stirrup 16 the other leg of which likewise forms a ratchet 15. The U-shaped stirrup 16 is rotatably mounted on an axle 18 the two ends of which are fixedly mounted in the side walls 2 and 3 of the main housing 1¹. Part of this axle 18 is surrounded by a helical torsion spring 19 which urges the U-shaped stirrup 16 by straight projecting ends in counter-clockwise direction, as seen in the direction of the arrow of the line III—III of FIG. 1, so that normally the ratchets 15 and 17 are pressed against the toothed wheels 10 and 11.

Figure 2:
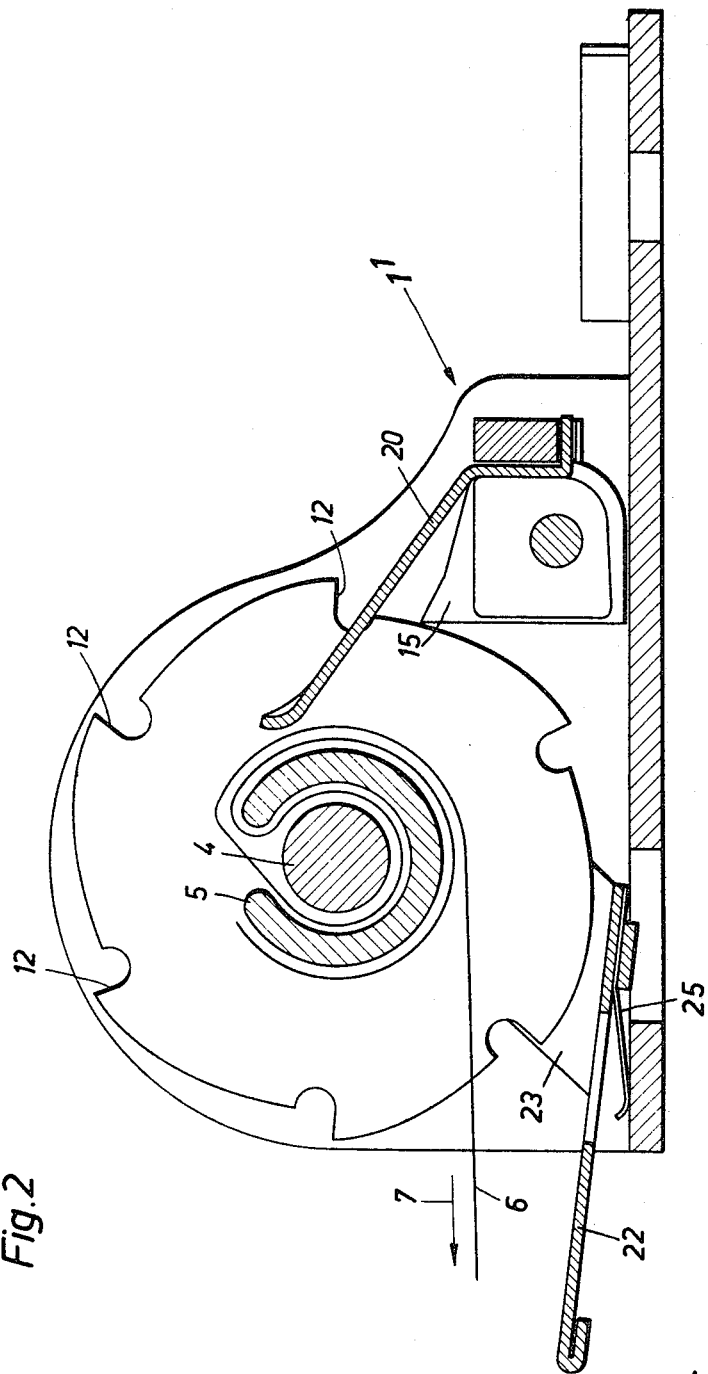
FIG. 2 is a cross section on the line II—II of FIG. 1.
Figure 4:
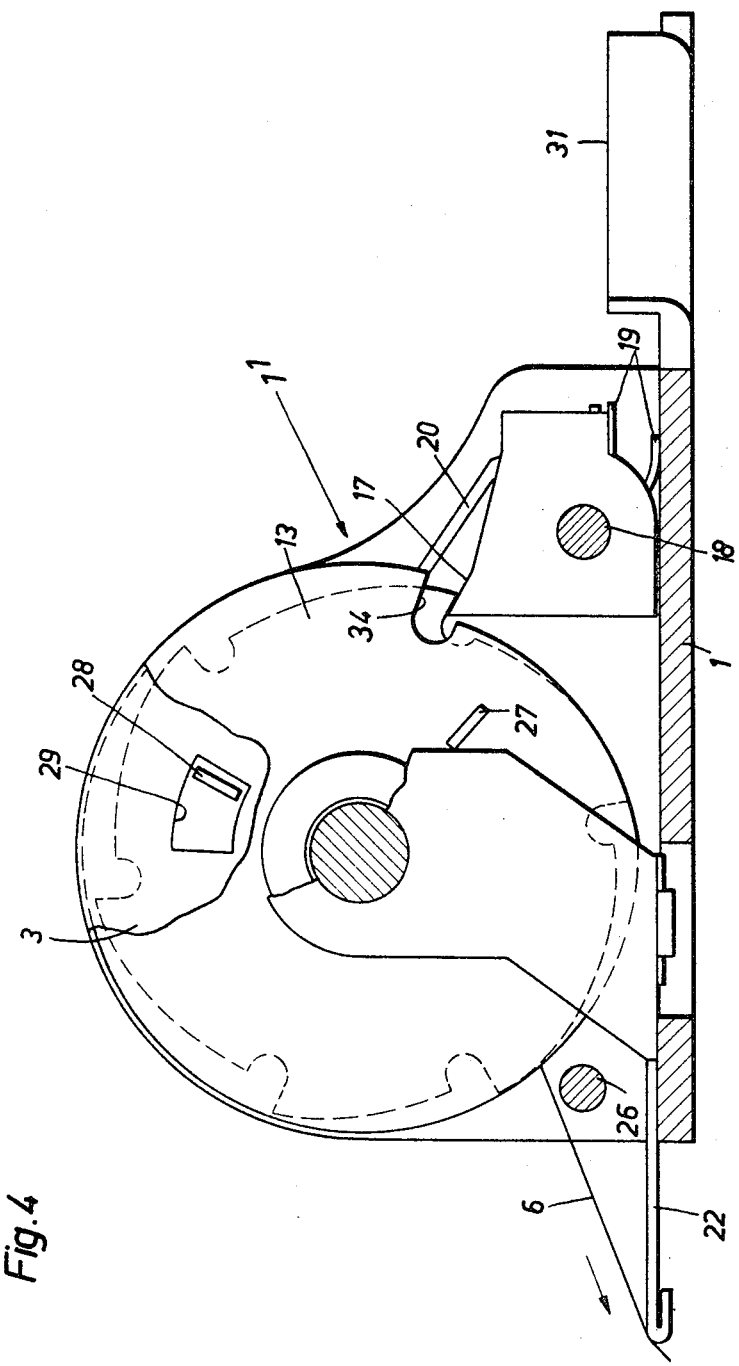
FIG. 4 is a view similar to FIG. 3 but with the ratchet being shown in locking position.

The ratchets 15 and 17 are associated with an operating lever 20 which is rotatably mounted on the axle 18 and connected to the U-shaped stirrup 16. The arrangement is such that when the operating lever 20 is lifted the ratchets 15 and 17 are pivoted in clockwise direction about the axle 18, as illustrated in FIGS 2 to 4.

The self-retracting webbing roller further comprises a belt guide member consisting of a guide plate 22 which is pivoted on the shaft 4 by means of two arms 23 and 24. As shown in FIG. 3, through the intermediary of a spring 25 the guide plate 22 is normally, i.e. in operative position, urged about the axle 4 in clockwise direction so far as is necessary for allowing the front edge of the arm 24 to bear against a stop 26 provided on the side wall of the housing 1¹ (FIG. 3). At the same time the rear edge of the arm 24 is engaged by a cam 27 of the unlocking disk 13 when the latter retains the ratchet 17 in its unlocking position, as shown in FIG. 3.

In addition to the cam 27 the unlocking disk 13 carries a second cam 28 which, as shown in FIG. 3, engages in a window 29 provided in the side wall 3 of the housing 1¹. The width of the window 29 is so chosen that the unlocking disk 13 can be turned through an angle of rotation from the position shown in FIG. 3, in which by means of its nose 34 it retains the ratchet 17 and thus also the ratchet 15 in their unlocking positions, into other positions shown in FIG. 4 in which it releases the ratchets 15 and 17 into their locking positions.

In the above-described embodiment of the invention the main housing 1¹ comprising the base plate 1 and the side walls 2 and 3 has a tongue 31 provided with a bore 30 so that it can be secured to an anchoring place on the body of the vehicle, whereas the free end of the webbing belt 6 is fixed to the vehicle at another place.

The self-retracting webbing roller according to the invention operates as follows:

If the webbing belt 6 is to be pulled out, i.e. uncoiled, the operating lever 20 need only be momentarily lifted by means of the coiled up webbing belt 6 so that the ratchets 15 and 17 are moved into their unlocking positions. By pulling at the webbing belt 6 it is uncoiled while, at the same time, the hollow shaft 5 rotates in clockwise direction (when looking in the direction of the arrows of the line III—III of FIG. 1) and so do the toothed wheels 10 and 11. Already at the beginning of the rotary movement of the toothed wheel 11 the unlocking disk 13, too, is taken along owing to the frictional effect exerted on the toothed wheel 11 by the spring 14 until the cam 27 comes to rest against the arm 24 and the cam 28 engages the edge of the window 29 (FIG. 3). In this position of the unlocking disk 13 the nose 34 retains the ratchet 17 and thus also the ratchet 15 in their unlocking positions so that no further continuous manipulation of the operating lever 20 is necessary. This means the operating lever 20 can be released immediately after the uncoiling process has started without interrupting this uncoiling process. However, if the uncoiling process is brought to an end or if the pull at the webbing belt 6 is only shortly interrupted for some reason, the return spring 8 immediately initiates a retracting movement. During this retracting movement of the webbing roller the unlocking disk 13, too, is rotated in counter-clockwise direction (FIGS. 2 to 4) since it is taken along owing to the frictional contact with the toothed wheel 11 when the latter rotates. This is, however, merely a slight partial rotation of the unlocking disk 13 which is limited by its cam 28 when abutting against the edge of the window 29 (FIG. 3). This rotation, however, suffices to release the ratchet 17 upon reaching the nose 34 and thus also the ratchet 15 in a manner that under the tension of the helical spring 19 they engage in the toothed wheels 10 and 11, whereby a further uncoiling of the webbing belt 6 is blocked even if the pull is only slightly reduced.

The guide member 22 offers the additional possibility of shifting the ratchets 15 and 17 from their unlocking positions into their locking positions since upon depressing the guide member 22 the arm 24 thereof rotates the unlocking disk 13 in counter-clockwise direction by engaging the cam 27 so that the nose 34 of the unlocking disk 13 releases the ratchet 17, enabling the latter and the ratchet 15 to engage and lock the toothed wheels 10 and 11, respectively. This kind of release will definitely occur in the case of an accident since in such a case the webbing belt 6 presses down the guide member 22, as can be seen from FIG. 4.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

For example, it is possible to make a different arrangement by slightly modifying the construction disclosed. The illustrated housing forms then that part of a buckle in which another part of the buckle can be inserted. The construction may also be such that the part of the buckle to be inserted supports the ratchets and the U-shaped stirrup 16 from its rear side in such a manner that tilting the ratchets into their unlocking positions is only possible when the attached part of the buckle has been removed.

We claim:

1. A self-retracting webbing roller apparatus for safety belts comprising:

(a) a main housing having a base plate and side walls;

(b) a spring-loaded roller rotatably mounted in said housing;
(c) at least one toothed wheel fixed to the roller;
(d) a pivotally mounted and spring-loaded pawl having a locked position and an unlocked position;
(e) a self-acting member controlling the pawl, said member comprising a rotatably mounted disk adjacent said toothed wheel and having a cam;
(f) spring means mounted in said housing forcing the said disk against said toothed wheel to cause a frictional contact between said disk and said toothed wheel;
(g) means limiting the turning range of the disk to a small angle of rotation;
(h) the pawl contacting the cam to be in unlocked position during the uncoiling of a belt and said pawl being disengaged from said cam to be in locked position when tension on the belt is reduced.

2. A self-retracting webbing roller apparatus as defined in claim 1 wherein a spring housing is secured to the outer side of the main housing to accommodate a return spring which is operably connected with the said roller.

3. A self-retracting webbing roller apparatus as defined in claim 1 wherein the said limiting means includes stops mounted within said housing.

4. A self-retracting webbing roller apparatus as defined in claim 1 including a guide plate movably mounted on said main housing to effect rotation of the disk into the locked position.

5. A self-retracting webbing roller apparatus as defined in claim 4 wherein the webbing belt automatically actuates the guide plate when the said belt is subjected to strong tensile stress.

6. A self-retracting webbing roller apparatus as defined in claim 4 wherein the pawl rests against the said disk in its unlocked position.

7. A self-retracting webbing roller apparatus as defined in claim 6 including an operating lever connected to said pawl to move said pawl from its locked position into its unlocked position.

References Cited

UNITED STATES PATENTS

| | | | |
|---|---|---|---|
| 2,569,020 | 9/1951 | Rotherham | 242—107.4 |
| 3,105,662 | 10/1963 | Wrighton | 242—107.4 X |
| 3,174,704 | 3/1965 | Replogle | 242—107.4 |
| 3,240,510 | 3/1966 | Spouge | 242—107.4 X |
| 3,289,970 | 12/1966 | Board et al. | 242—107.4 |

FOREIGN PATENTS 125,997  12/1901  Germany.

WILLIAM S. BURDEN, *Primary Examiner.*